United States Patent [19]

Gaulin et al.

[11] Patent Number: 4,551,487
[45] Date of Patent: Nov. 5, 1985

[54] ENHANCED CARBON FIBER COMBUSTION USING A CATALYST

[75] Inventors: Camille A. Gaulin, Huntington Beach; Howard A. Katzman, Los Angeles, both of Calif.

[73] Assignee: The Aerospace Corporation, El Segundo, Calif.

[21] Appl. No.: 523,452

[22] Filed: Aug. 15, 1983

Related U.S. Application Data

[63] Continuation of Ser. No. 303,061, Sep. 17, 1981, abandoned.

[51] Int. Cl.$^4$ ................................................ C08K 9/02
[52] U.S. Cl. ..................................... 523/215; 524/495
[58] Field of Search ......................................... 523/215

[56] References Cited

U.S. PATENT DOCUMENTS

| 4,177,159 | 12/1979 | Singer | 523/215 |
| 4,311,630 | 1/1982 | Humphrey et al. | 523/215 |

FOREIGN PATENT DOCUMENTS 57-117535  7/1982  Japan ................................. 523/215

Primary Examiner—Lewis T. Jacobs

[57] ABSTRACT

A catalyst introduced into the filament of a carbon fiber to enhance thermal oxidation thereby ensuring complete combustion of the fiber along with its matrix in composites in an unanticipated or deliberate incineration.

1 Claim, 2 Drawing Figures

ENHANCED CARBON FIBER COMBUSTION USING A CATALYST

STATEMENT OF THE GOVERNMENT INTEREST

The invention described herein may be manufactured and used by or for the Government of the United States for governmental purposes without the payment of royalty therefor.

This application is a continuation of application Ser. No. 303,061, filed Sept. 17, 1981, now abandoned.

BACKGROUND OF THE INVENTION

1. FIELD OF THE INVENTION

This invention relates generally to the field of carbon fibers, and relates specifically to the field of enhancing combustion of carbon fibers.

2. PRIOR ART

The increasing use of carbon fiber-reinforced-resin matrix composites in aircraft construction and in sporting goods raises the prospect of potentially serious problems when these materials are involved in accidents accompanied by fire or are disposed of by incineration. When the binding resin matrix in such composites is destroyed by combustion, the fibers resist incineration and their light weights and high aspect ratios combine to facilitate their being lofted in an air current. Frequently the lofted fibers settle on electrical equipment where their high electrical conductivity may cause shorting and consequent failure of the equipment. This phenomenon is well known in the carbon fiber manufacturing community where extreme measures are needed to protect against fiber escape and attendant equipment malfunction.

The problems posed are potentially serious and they will assuredly be aggravated as expected usage of carbon-resin composites materializes in automobile manufacture, prompted by a reduced weight approach to achieving government-mandated environmental and energy goals.

Possible solutions to the problem abound, but so far none has been satisfactorily demonstrated. Among the possible solutions are: Modifications in fiber processing to reduce electrical conductivity, the practical limit to this approach is not known, but the value of electrical resistance already achieved is $10^5$ to $10^6$ ohm/cm and this is not adequate in many situations. Use of exotic resin matrices to insure a high yield of stable char which would retain carbon fiber, preventing its escape, but the exotic resins tend to be expensive and difficult to process so that their use may be resisted by manufacturers. Coating carbon fibers with high electrical resistance materials, generally these coatings are brittle, adhere poorly to carbon, and would require several years to satisfactory development; and exclusive disposal in sanitary landfill, this does not provide a solution for the accidental fire problem, cannot be controlled since the uninformed may still dispose for routine incineration, and in any case only defers the problem to a later time. The above problems are discussed in detail in a NASA Technical memorandum No. 78761 by Dennis L. Drew, dated July, 1978.

SUMMARY OF THE INVENTION

It is an important object of the invention to apply a catalyst to carbon fiber to enhance its burning rate to thereby ensure complete combustion thereof along with its binding resin matrix in composites.

Another important object of the invention is the introduction of a catalyst as a fine dispersion into the body of the fibers in the early stages of processing to ensure uniform and complete thermal oxidation at a relatively low temperature.

BRIEF DESCRIPTION OF THE DRAWINGS

Various other objects, advantages and meritorious features of the invention will become more fully apparent from the following specification, appropriate claims and accompanying drawing sheets.

The features of a specific embodiment of the invention are illustrated in the drawings, in which.

DESCRIPTION OF THE PREFERRED EMBODIMENT

Figure 1:
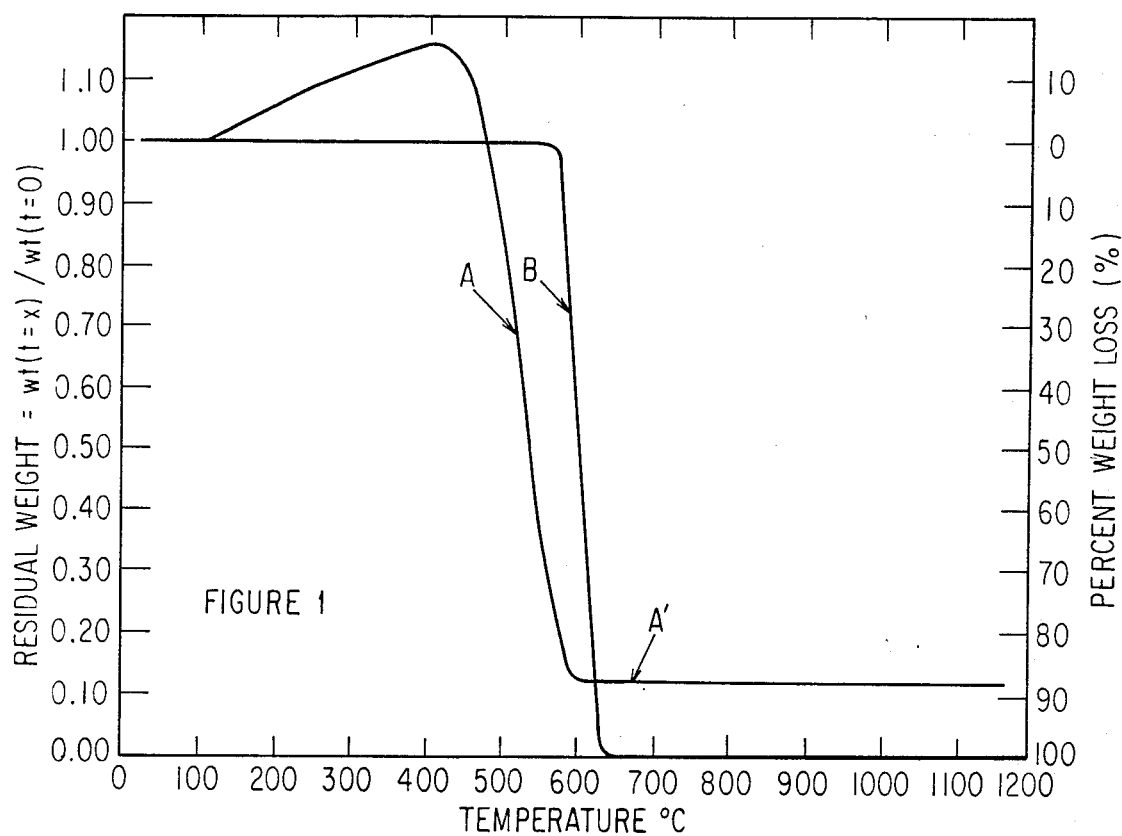
FIG. 1 is a thermogram of catalyst treated and untreated Thornel 300 carbon fiber.
Figure 2:
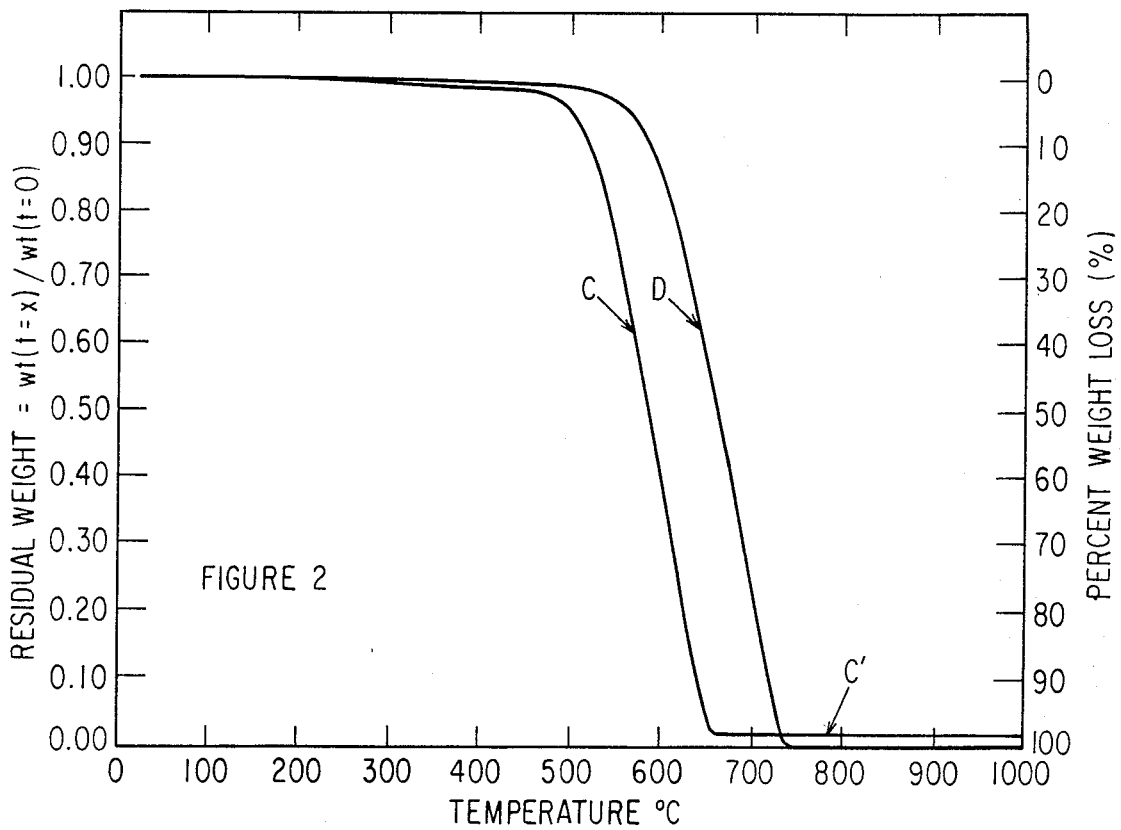
FIG. 2 is a thermogram of catalyst treated and untreated GY-70 carbon.

Referring to FIGS. 1 and 2 by the characters of reference, there is illustrated thermograms showing the enhanced thermal oxidation of the carbon fiber induced by the catalyst.

In the present invention, the object is to ensure complete burning of carbon fiber along with its matrix in composites in an accidental or unanticipated fire or incineration, by incorporation into the body of the fiber a catalytic metal such as vanadium (V), a metal oxide such as vanadium trioxide ($V_2O_3$), or a hydrolyzible-oxidizable metal-organic complex such as vanadium triethylate [$VO(OC_2H_5)_3$] that enhances thermal oxidation. Introduction of the catalyst either as vanadium (V), vanadium monoxide (VO), vanadium trioxide ($V_2O_3$), or vanadium pentoxide ($V_2O_5$) or other oxides of vanadium, or the complex vanadium triethylate [$VO(OC_2H_5)_3$] into a polymeric precursor of the carbon fiber will ensure a homogeneous, intimate fine dispersion of catalyst in the filaments of the carbon fiber that will assure its complete combustion.

In particular, as a first case, the catalyst or its parent compound may be imbibed from solution into the coagulated swollen filaments of the polymeric fiber precursor of the carbon fiber by an imbibing process well known in the art. As a second case, the catalyst in a dry powder state may be combined through mechanical agitation with the polymeric dope precusor to the carbon fiber, that is, in its prefiber or semisolid state.

The invention is not limited to the catalysts vanadium or its catalytic oxides, but may also include metals and their catalytic oxides in the same or neighboring periods (IVB, VB, VIB) of the periodic table, such as molybdenum (Mo), tungsten (W), tantalum (Ta), niobium (Nb), hafnium (Hf), zirconium (Zr), and titanium (Ti) and chromium (Cr).

Operative examples are given infra to demonstrate the catalytic oxidative capabilities of vanadium trioxide ($V_2O_3$). As a first example Thornel 300 is used. It is a commercial carbon fiber yarn that developed by the Union Carbide Corporation. Thornel 300 carbon fiber is based upon polyacrylanitrile precursor. The yarn or carbon fiber that is surfaced-treated by dipping momentarily into a solution of vanadium triethylate [$VO(OC_2H_5)_3$], 0.05 Vol % in xylene solvent. Note that vanadium triethylate [$VO(OC_2H_5)_3$] is a hydrolyzible and oxidizable metal-organic complex or parent compound. The treated carbon fiber is allowed to drain and air-dry for a few minutes and is transferred to a vacuum oven where the solvent is further removed by drying at 200° F. (93° C.) for 24 hours. Samples of treated and untreated Thornel 300 carbon fiber may then be subjected to thermogravimetric analysis in a flowing air atmosphere. The resultant thermograms for treated and untreated Thornel 300 carbon fiber at (A and B) respectively are shown in FIG. 1. For FIGS. 1 & 2, residual weight is equal to the ratio of weight at time X divided by weight at time zero on the left Y-axis, percent weight loss on the right Y-axis and temperature in degrees centigrade on the X-axis. The curves show that untreated Thornel 300 carbon fiber at (B) in the severe oxidizing environment undergoes rapid combustion beginning at about 570° C. For treated Thornel 300 carbon fiber at (A), the catalyzed oxidation of the carbon fiber begins at about 425° C. going to complete combustion. The residue remaining represents nonburnable catalyst. Weights of the carbon fiber yarn before at (B) and after at (A) treatment and drying indicate that the amount of oxide residue from vanadium triethylate absorbed on the surface was 6.42 Wt. %. Note the catalyst as residue at (A') in FIG. 1. Thus, although a surface treatment is less ideal than a fine dispersion introduced into the body of the fiber as described supra, the principle of the invention is well demonstrated, since the onset of combustion of the carbon fiber is reduced in temperature by about 150° C. for treated Thornel 300 carbon fiber at (A).

As a second example, GY-70 yarn or carbon fiber otherwise known as Celanese GR-3-154-01, Bobbin No. 6208 was used. It was developed by the Celanese Research Corporation as a commercial carbon fiber. The carbon fiber was treated by soaking for 4 hours in a vanadium triethylate [VO(OC$_2$H$_5$)$_3$] solution, 0.05 Vol. % Xylene/toluene mixed solvent. The fiber was thoroughly dried for 24 hours in vacuum (30 in. Hg) at 200° F. Weights before and after treatment indicated surface pickup of 1.14 wt. %. Vanadium triethylate is a hydrolyzible-oxidizable metal-organic complex. Thermograms as shown in FIG. 2, of the treated GY-70 carbon fiber at (C) and untreated GY-70 carbon fiber at (D) in the less severe static air environment showed a reduction of about 70° C. in combustion onset. Note the catalyst as residue at (C') in FIG. 2.

The overall chemical reactions occurring are in the equations as given infra. In the first reaction the vanadium triethylate [VO(OC$_2$H$_5$)$_3$] hydrolyzes in atmospheric air to an oxide of vanadium (VO) in a low state of oxidation, reduced under the influence of the carbon in the fiber. In the second reaction, on subsequent exposure to air and heat, the lower oxide converts to vanadium trixode (V$_2$O$_3$) which is the active catalyst in this instance. Reaction two accounts for the early weight gain for a given treated carbon fiber when heated in air.

(1) $VO(OC_2H_5)_3 + 3/2H_2O + 3/2C = VO + 3/2CO + 3C_2H_5OH$ (2) $2VO + \frac{1}{2}O_2 = V_2O_3$ It will be appreciated that a catalytic oxide or metal oxide such as vanadium trioxide (V$_2$O$_3$) is preferred over a pure catalytic metal such as vanadium due to the fact that it is easier to adhere the vanadium to the carbon fiber in the supra imbibing technique and also because the catalytic oxidation promotes the carbon-oxygen oxidation. It will be further appreciated that metal-oxides or catalytic oxides such as vanadium trioxide are formed from a hydrolyzible-oxidizable metal-organic complex such as vanadium triethylate [VO(OC$_2$H$_5$)$_3$] to give them combustibility relative to the carbon fibers that are to be incinerated.

As indicated supra, the most efficient use of the invention is to use the oxidation catalyst such as vanadium trioxide (V$_2$O$_3$) as an internal dispersion within the filaments of the carbon fibers, thus providing intimate contact with all the carbon within the length and cross-section of the fibers. This would improve the efficiency of the vanadium trioxide catalyst's activity, further reducing combustion temperature of the carbon fiber.

The particular novel features of the invention are: First, the application of a catalyst such as vanadium trioxide to carbon fiber to enhance its burning rate and thus reduce the minimum combustion temperature; and secondly, the introduction of a catalyst such as vanadium trioxide, as a fine dispersion into the body of the filaments of the carbon fibers in the early stages of processing to further enhance its combustion rate.

From the foregoing description of a specific embodiment illustrating the fundamental features of the invention, it will now be apparent to those skilled in the art that the invention may be accomplished in a variety of forms without departing from the true spirit and scope thereof. Accordingly, it is understood that the illustrated invention disclosed herein is a preferred embodiment thereof and that the invention is not to be limited thereby, but only by the appended claims.

What is claimed is:

1. A carbon-fiber-reinforced-resin matrix comprising filaments of a carbon fiber having introduced internally a fine dispersion of vanadium trioxide catalyst for enhancing combustion of the carbon fiber.

* * * * *